United States Patent Office 3,554,652
Patented Jan. 12, 1971

3,554,652
INDICATOR SYSTEMS FOR ANGLE-MEASURING INSTRUMENTS INCLUDING AN ALTITUDE CIRCLE
Wieland Feist and Ulrich Schmidt, Jena, Germany, assignors to VEB Carl Zeiss Jena, Jena, Germany
Filed May 8, 1969, Ser. No. 827,468
Int. Cl. G01c 1/06
U.S. Cl. 356—139                                2 Claims

ABSTRACT OF THE DISCLOSURE

An indicator system for altitude circles of angle-measuring instruments comprises an imaging system by which a first of two diametrically opposite places in the circle is imaged in a plane wherein this image and the second place in the circle can be viewed via a beam-combining system. The imaging system, or part thereof, or the beam-combining system may be suspended in the manner of a pendulum.

---

Figure 1:
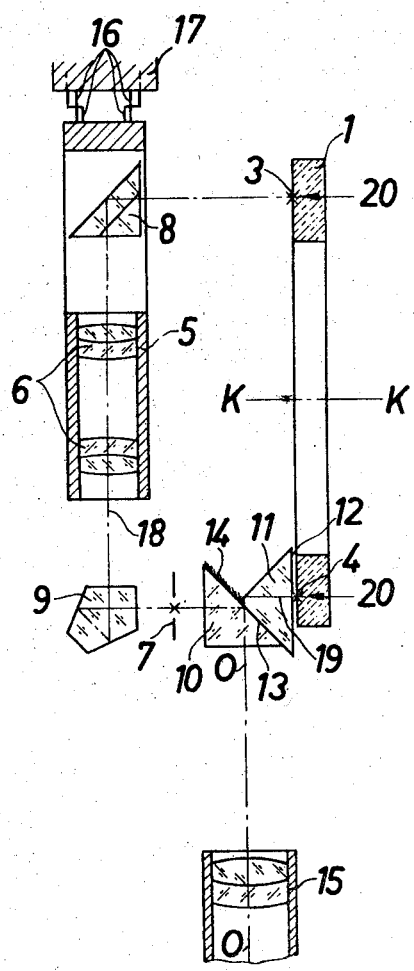

This invention relates to indicator systems for angle-measuring instruments comprising an altitude circle with only one scale, a first and a second place diametrically opposed to one another in this scale being optically instrumental in the formation of an average, an imaging system for producing an image of the first place, optical means for combining the light-beams from both places, and a visual system, the optical means being allocated to the visual system for viewing the second place and the image of the first.

Some theodolite altitude circles with only one measuring scale and with symmetrically arranged indicator systems comprise an intermediate imaging system for each of said two places and a visual system for coincidence reading. The two intermediate imaging systems by way of oppositely deviating elements image the said places in the image plane of the visual system. In other known indicator systems, two symmetrically disposed reflectors combine the beams emanating from the two reading-off places in the scale and direct them to a common visual system. The altitude circles of the aforementioned kind require additional optical means for the intermediate imaging of each of the two places in the scale, and the said known indicator systems require the objective of the visual system to have a comparatively large focus and for image brilliancy a wide aperture. Moreover, the known indicator systems of theodolites utilizing an altitude circle with only one scale will hardly admit an interposition of means for stabilizing the collimation line.

The present invention aims at obviating the disadvantages of the prior art by providing an indicator system of simple construction which is insensitive to errors of measurement and easily permits the interposition of a collimation-line stabilizer.

According to the present invention, the image plane of the first place in the scale of the altitude circle and the plane of the second place in this scale occupy positions different from one another, and the means for combining the respective two light-beams are located between the image plane and the plane containing said second place. The advantages of circles with only one beam-splitting zone and the advantages of the image of the one place on the image of the other place are thus combined to the exclusion of the inherent disadvantages of these arrangements. As measurement with only one scale requires only narrow optically homogenous zones, the processing of altitude circles is simplified and the output accordingly increased. Moreover, as only one place in the scale is imaged in the object plane of the common visual system, errors due to optical and mechanical variations can arise in only one image. The indicator system of the invention is also ideally adapted for the installation of a collimation-line stabilizer, it being easy for the imaging system of the one place to be suspended entirely or in part in the manner of a pendulum. Alternatively, pendulum suspension is possible for the optical deflecting means, particularly the optical means for combining the two light-beams.

Figure 2:
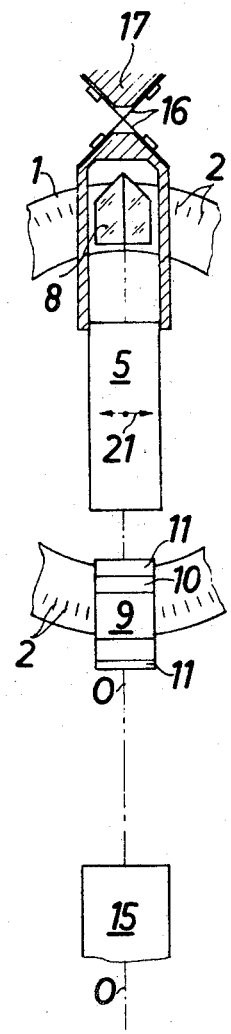
Figures 3, 4:
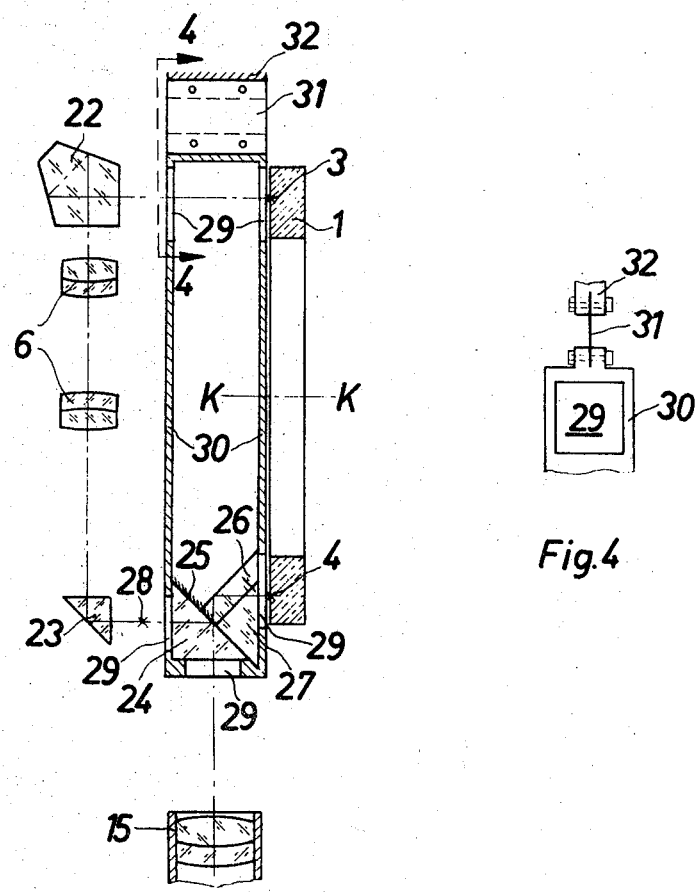

In order that the invention may be more readily understood, reference is made to the accompanying drawings which illustrate diagrammatically and by way of example two embodiments of the invention, and in which:

FIGS. 1 and 2 are two longitudinal sections mutually at right angles of one embodiment, in which part of the elements producing the intermediate image are suspended, FIG. 3 is a longitudinal section of another embodiment, in which the means for combining the light-beams are suspended, and FIG. 4 is a view taken from line 4—4 in FIG. 3.

In FIGS. 1 and 2 of the drawings, an altitude circle 1 comprises a scale 2 and two reading places 3 and 4 diametrically opposed to one another. The optical axis K—K of the altitude circle 1 coincides with the tilting axis of a theodolite (not shown). The reading place 3 lies in the object-side focal plane of an imaging system 6 which is set in a mount 5 for producing an intermediate image in a plane 7. A right-angled ridge-prism 8 is located between the imaging system 6 and the place 3, and a penta-prism 9 is located between the imaging system 6 and the intermediate-image plane 7, which is parallel to the plane of the circle 1. A beam-combining system made up of two right-angled prisms 10 and 11 having a common principal reflecting plane is so located between the place 4 and the intermediate-image plane 7 parallel to the plane of the circle 1 that the hypotenuse surface 12 of the prism 11 is parallel to and faces the plane of the circle 1, that part of a cathete surface of the prism 11 contacts the hypotenuse surface 13 of the prism 10, and that a cathete surface of the prism 10 is parallel to the intermediate-image plane 7. The part of the hypotenuse surface 13 of the prism 10 which does not contact the prism 11 is provided with an opaque cover 14 one end of which is conjugate to the optical axis O—O of a common visual system 15 (shown in part only) and acts as a separating edge. Cross-tapes 16 secured to a stationary base 17 suspend the mount 5 including the imaging system 6. The place 4 and the intermediate-image plane 7 lie in the object-side focal plane of the visual system 15. The axial rays 18 and 19 of the light-beams respectively emanating from the places 3 and 4 are combined in the separating edge of the cover 14 with one another and with the optical axis O—O.

When the places 3 and 4 are illuminated by rays traveling along the direction of arrows 20, the imaging rays emanating from the place 3 and entering the ridge-prism 8 are deflected into the intermediate imaging system 6 which, by way of the prism 9, images the place 3 in the intermediate-image plane 7, the ridge of the prism 8 having produced lateral inversion. A beam of imaging rays (not shown) from the image in plane 7 and reflected by the hypotenuse surface 13 arrives in the visual system 15, particularly through the influence of the part of the hypotenuse surface 13 which carries the cover 14. Similarly, the visual system 15 receives a beam of imaging rays (not shown) which emanates from the place 4 and is reflected by the cathete surface of the prism 11 not in contact with the hypotenuse surface 13 of the prism 10.

If the entire system shown in FIGS. 1 and 2 is inclined in a plane parallel to the drawing plane of FIG. 2, the mount 5 including the intermediate imaging system 6 oscillates, by dint of its suspension by the cross-tapes 16, in the directions of double arrow 21 into a new position of equilibrium such that the influence of the inclination on the measurement of the altitude angle is compensated.

In FIGS. 1 and 2, the line interconnecting the two diametrically opposed places 3 and 4 is vertical.

The intermediate imaging system 6 may also be stationary, in which case system inclinations of the entire system are not compensated.

In FIGS. 3 and 4, which illustrate another embodiment of the present invention, parts identical with parts in FIGS. 1 and 2 are referred to by corresponding numerals. This other embodiment comprises an altitude circle 1 which tilts about an axis K—K, diametrically opposite places 3 and 4 in the circle 1, an intermediate imaging system 6, and a visual system 15. A pentaprism 22 located between the intermediate imaging system 6 and the place 3 deviates the rays from the place 3 by 90° so as to direct them to the intermediate imaging system 6. Two right-angled prisms 23 and 24 located between the intermediate imaging system 6 and the visual system 15 causes the imaging rays from the intermediate imaging system 6 to be shifted parallel to themselves, so as to enter the visual system 15. Part of the hypotenuse surface of the prism 24 carries an opaque cover 25 such that only those imaging rays from the place 3 can enter the visual system 15 which are reflected by the cover 25. A right-angled prism 27 the hypotenuse surface of which is parallel to the plane containing the circle 1 and one of whose cathete surfaces has a ridge 26 is cemented with its other cathete surface to that part of the hypotenuse surface of the prism 24 which does not carry the cover 25. This coverless part of the hypotenuse surface permits the entry into the visual system 15 of substantially only the imaging rays from the place 4. This place 4 and an intermediate-image plane 28 between the two right-angled prisms 23 and 24 lie in the object-side focal plane of the visual system 15. The two prisms 24 and 27, which form a beam-combining system, are fixed in a hollow pendulum body 30 which has apertures 29 for the entry and the exit of light and is suspended by a flat spring 31 attached to a base 32.

The intermediate imaging system 6 images the place 3 in the intermediate-image plane 28. This means however that the imaging rays are deflected by the prisms 22 and 23. The imaging rays from the place 4 are deflected by the prism 27 into the visual system 15. The ridge 26 causes the beam of these rays to be laterally inverted by the deflection, and the images of the places 3 and 4 produced by the visual system 15 are displaced in an opposite direction to that of the rotation of the circle 1 about the axis K—K. If the diameter containing the places 3 and 4 differs from the vertical by a certain amount, the base 32 is inclined by the same amount, so that the pendulum body 30 swings into a new position of equilibrium. In this new position, readings are taken from the places in the altitude circle 1 which lie in the vertical.

Alternatively, it is possible to suspend the prism 23, instead of the prisms 24 and 27, in which case the prism 23, not the prism 27, must have the ridge 26.

Naturally, the structural parts also of the embodiment shown in FIGS. 3 and 4 may be stationary or locked, so that the reading is not stabilized when the system is inclined.

We claim:

1. An indicator system for altitude circles of angle-measuring instruments comprising:

a graduated circle, a first and a second reading place diametrically opposed to one another on said circle, two imaging ray-paths for imaging said reading places, an intermediate imaging system with broken optical axis for imaging one of said reading places in a plane, reflectors for breaking the optical axis of said intermediate imaging system, said first reading place lying in the optical axis and in the object-side focal plane of said intermediate imaging system, an optical system for combining said imaging ray-paths and comprising two reflecting surfaces which have a common principal reflection plane and enclose an angle of substantially 90°, and a visual system, one of said reflecting surfaces being fast with the other reflecting surface and lying in only one of said imaging ray-paths for the reflection of this one path through the other of said reflecting surfaces to said visual system, said other reflecting system reflecting said other imaging ray-path into said visual system, and its parts traversed by said one imaging ray-path being silvered.

2. An indicator system as claimed in claim 1, wherein at least one optical member is suspended in the manner of a pendulum.

References Cited

UNITED STATES PATENTS

| | | |
|---|---|---|
| 2,779,231 | 1/1957 | Drodofsky. |
| 2,757,567 | 8/1956 | Hillman et al. |
| 3,200,696 | 8/1965 | Lang et al. |
| 3,382,756 | 5/1968 | Schneider et al. |

RONALD L. WIBERT, Primary Examiner

P. K. GODWIN, Assistant Examiner

U.S. Cl. X.R.

356—247, 250